May 22, 1934. A. B. CHANCE Re. 19,177
EARTH ANCHOR
Original Filed March 14, 1928 2 Sheets-Sheet 1
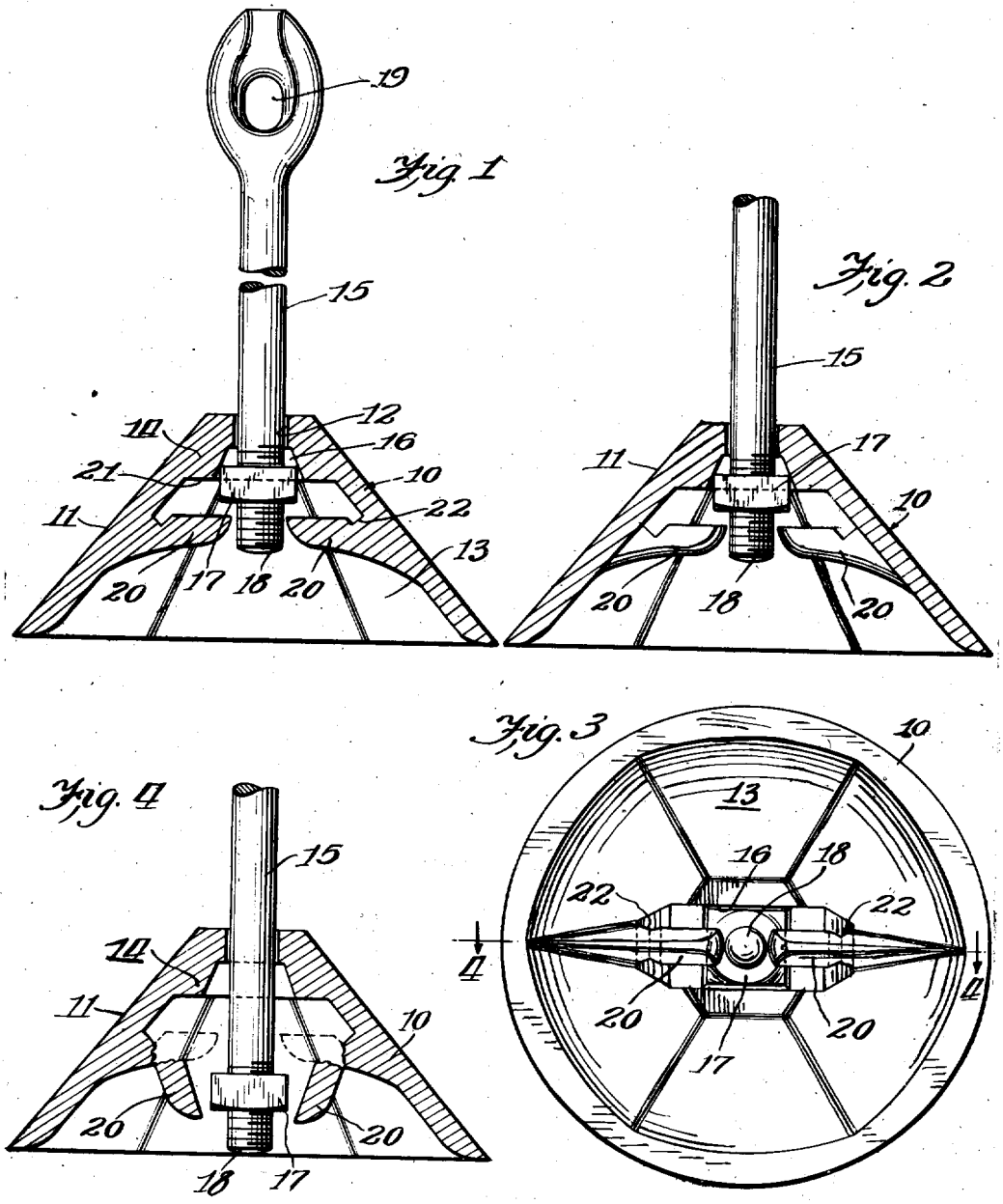
Inventor.
Albert B. Chance
By Williams, Bradbury, McCaleb & Hinkle. Attys.

May 22, 1934. A. B. CHANCE Re. 19,177

EARTH ANCHOR

Original Filed March 14, 1928 2 Sheets-Sheet 2

Inventor:
Albert B. Chance

By Williams, Bradbury, McCaleb & Hinkle
Attys.

Reissued May 22, 1934

Re. 19,177

UNITED STATES PATENT OFFICE 19,177

EARTH ANCHOR

Albert B. Chance, Centralia, Mo.

Original No. 1,755,811, dated April 22, 1930, Serial No. 261,498, March 14, 1928. Application for reissue January 23, 1932, Serial No. 588,451

15 Claims. (Cl. 189—90)

The present invention relates to earth anchors, and is more particularly concerned with all types of earth anchors having guy rods secured thereto by nuts or similar fastening means.

The present invention is equally adaptable to anchors of the cone type, as well as other types, such as the expanding anchor shown in Taylor & Sutcliffe Patent No. 1,546,327, dated July 14, 1925. In the installation of such anchors, it is customary to insert the threaded end of the guy rod in the aperture provided in the anchor and to place a nut on the guy rod below the anchor. After a hole has been dug, the guy rod serves as a handle for positioning the anchor in the hole, but considerable difficulty is experienced in the insertion of the anchor, because the anchor is relatively loose upon the rod, and it tends to catch in the dirt above the base of the hole, the guy rod sliding down through the anchor.

It is also highly desirable that the anchors be so constructed that when they are no longer required, the guy rod may be easily removed or otherwise displaced from its normal position, in which it projects above the earth, forming a dangerous and often invisible obstruction in the weeds along the right of way. As the nut is generally rusted fast to the rod even after a short period of use and exposure to the humid conditions in the earth, it is difficult, if not practically impossible, to remove the guy rod entirely without digging up the anchor. The latter course would obviously involve too much labor, and I prefer to drive the guy rods through the anchors into the earth with a sledge hammer or other driving tool, until the top of the guy rod is sunk into the earth.

This operation is impossible with the guy rods and anchors of the prior art, and one of the objects of the present invention is the provision of means for securing a guy rod to an anchor, which also permits the driving in of the guy rod at a later time when it is desired to bury the guy rod in the earth.

Another object of the invention is the provision of earth anchors having thrust means for resisting separation of the guy rod and an anchor, and frangible means for securely positioning the anchor on the rod during installation, but which may be broken by a sledge hammer blow upon the upper end of the guy rod, so that the rod may be buried in the earth when desired.

Another object of the invention is the provision of means for securely positioning an anchor upon a guy rod for insertion in an anchor hole, said means having one or more points of weakness whereby said securing means may be broken by impact upon the end of the guy rod.

Other objects and advantages of my invention will appear more fully from the following description and from the accompanying drawings, in which similar characters of reference indicate similar parts throughout the several views.

Referring to the accompanying drawings, of which there are two sheets:

Figure 1 is an elevational view of the guy rod and anchor with the anchor shown in medial cross section;

Figure 2 is a similar view in partial cross section;

Figure 3 is a bottom plan view of the anchor;

Figure 4 is a view similar to Figure 1, showing the anchor after the retaining lugs have been broken for the purpose of releasing the guy rod to bury it in the earth;

Figure 5:
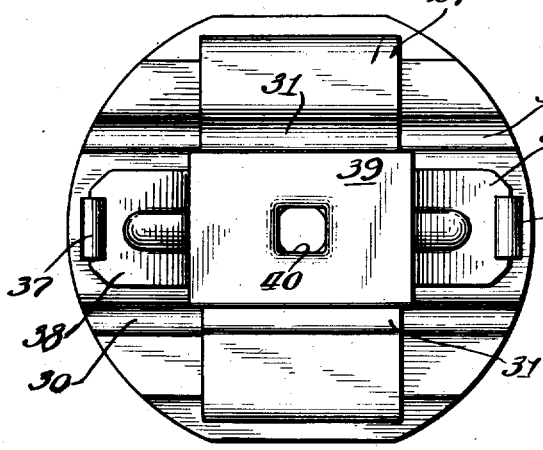
Figure 5 is a top plan view of the expanding type of anchor.

Referring to Figures 1 to 4, 10 indicates in its entirety a cone anchor of conventional type, comprising a cast metal body having a substantially frusto-conical exterior surface 11 and an axial bore 12. The cone anchor may be formed with a hollow interior 13 for the purpose of saving material and reducing the cost of the anchor, but the wall of the anchor may be substantially thickened at the top 14, adjacent the guy rod 15. Below the bore 12 the anchor is preferably provided with a non-circular depression 16 adapted to receive a nut 17 carried by the threaded end 18 of the anchor, and for convenience in casting, the depression 16 may be tapered toward the outside as shown.

The guy rod 15 may be provided with any type of eye 19 for securing a guy, and the rod is secured to the anchor by inserting the same through the bore 12 and threading the nut 17 upon the end 18. The nut 17 is adapted to resist separation of the rod 15 and the anchor 10 when tension is put upon the guy and guy rod, but it does not prevent the anchor 10 from sliding upward on the guy rod when the anchor is being inserted in the anchor hole, using the rod as a handle.

In the latter operation, difficulty is often experienced due to the fact that the anchor 10 will catch in the side of the anchor hole, and the guy rod 15 will then slide freely through the bore 12 to the bottom of the anchor hole, and considerable time may be wasted in positioning such anchors in the hole dug. I prefer to provide my anchor with means for positioning the anchor definitely upon the guy rod 15, and in the case of the cone anchor this means may consist of one or more integral cast metal lugs 20, extending from the inner wall of the cone anchor into the hollow chamber 13 adjacent the rod 15 and below the nut 17.

The lugs 20 are spaced sufficiently from the inside top of wall 21 of the chamber 13, so that the nut 17 may be inserted between said wall and the top of the lugs 20, and the rod 15 may then be inserted through the bore 12 and threaded into the nut 17, while the nut 17 is held in this positon, by hand or by the depression 16 in the anchor. I desire it to be understood that any number of the lugs 20 may be employed, providing they are so formed and located as to effect the purposes hereinafter described.

After the anchor and guy rod have been in the earth for even a short period of time, the nut 17 is invariably so corroded that it is difficult to remove it from the rod 15. If it is desired to abandon the anchor and guy rod 15, and this is the most economical course when the anchor is no longer required, I prefer to so form my anchor that the guy rod may be driven down into the earth by using a sledge hammer on the upper end of the guy rod. For this purpose the lugs 20 may be so formed that they can be broken by a blow with the sledge hammer on the top of the guy rod.

If desired, a definite line of weakness or a frangible point in the lugs 20 may be provided by forming a notch 22 in each of the legs adjacent the body of the anchor 10, but this is not necessary if the lugs are themselves made sufficiently frangible to be broken by a blow upon the guy rod 15, transmitted by the nut 17 to the lugs.

In Figure 4 I have illustrated the position of the lugs 20 after they have been broken by such an operation, and the guy rod 15 in Figure 4 may now be driven down into the earth and substantially buried beneath the surface of the earth so that it no longer forms a dangerous obstacle along the right of way.

Figure 6:
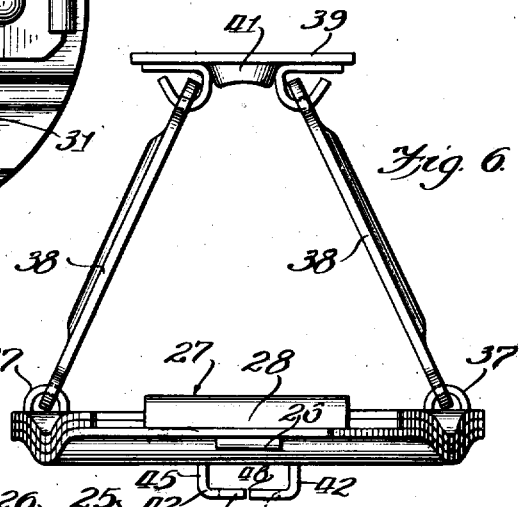
Figure 6 is a side elevational view of the same.
Figure 7:
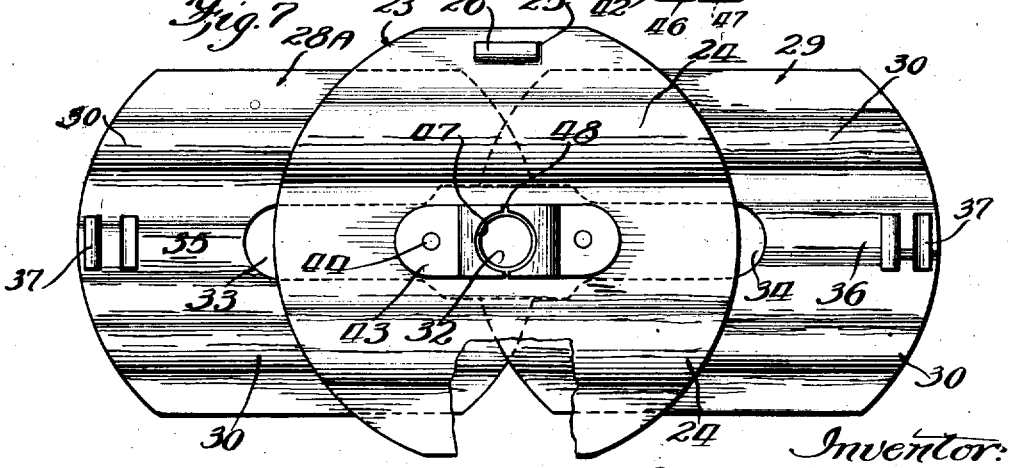
Figure 7 is a bottom plan view of the expanding anchor shown in expanded position.

Referring to Figures 5 to 7, I have here illustrated a two-way expansion anchor of the type shown in the patent to which reference is made above. As this type of anchor is described in detail in that patent, reference will merely be made to the various parts, but it will be observed that the present invention is adaptable to all types of anchors.

The expanding anchor may consist of a supporting plate 23 forming the bottom of the anchor and substantially circular in form, to utilize the full cross sectional area of a post hole. The bottom plate 23 is corrugated as at 24 to increase its strength, and it is provided with a pair of apertures 25 adapted to receive the bent-over lugs 26, carried by a guide plate 27 having a pair of downwardly turned flanges 28 for spacing said guide plate from the supporting plate 23.

Slidably mounted between the guide plate 27 and the supporting plate 23 are a pair of sliding plates 28 and 29 having smaller corrugations 30 adapted to nest with each other and with the corrugations 24 upon the supporting plate, as well as the corrugations 31 in the guide plate. The bottom plate 23 and the guide plate 27 are provided with registering central apertures 32 adapted to receive a guy rod, and the slide plates 28A and 29 are provided with elongated slots 33 and 34, respectively, also adapted to embrace the guy rod and register with the apertures 32 in any position of the sliding plates. The sliding plates 28 and 29 are also formed with an offset 35 and 36 extending parallel to the slots 33 and 34, in such manner that the separate legs of the plates 28 and 29 on either side of the slots 33 and 34 may be placed in converse position, one above the other on each side of the anchor, that is, the plate 28 crosses the plate 29 at the slots 33 and 34, and one leg of the plate 28 is above the plate 29 while the other leg of the plate 28 may be below plate 29.

The plates 28 and 29 are each pivotally connected by a U-shaped member 37 to a ribbed toggle link 38, the toggle links being pivotally connected at their opposite ends to a guide link 39 comprising a metal plate having a central aperture 40 formed with a flange 41 adapted to guide the plate 39 upon a guy rod. The guy rod may be inserted through the apertures 40 and 32 and the anchor secured to the rod by a nut below the bottom plate 23.

In order to provide similar means on this type of anchor for securely positioning the anchor on the rod and for permitting the release of the rod when it is to be abandoned, I provide the bottom plate 23 with a pair of frangible or bendable members 42 secured on said plate, adjacent the aperture 32. The frangible members 42 may each consist of a strip of sheet metal having an attaching flange 43, spot welded or otherwise secured to the bottom plate 23, as at 44, and also having an offset 45 and another flange 46 substantially parallel to the attaching flange 43. The offset 45 is of sufficient length to permit insertion of the nut between the bottom plate 23 and the flange 46, and the flange 46 may be provided with a semi-circular notch 47 adapted to register with the aperture 32 for the guy rod. The frangible members 42 are, of course, separated from each other at the point 48.

The operation of the present modification is substantially the same as previously described. The anchor and guy rod may be installed in the usual manner, and the anchor expanded by tamping upon the top plate 39, which transmits the force to the toggle links 38 and pushes out the sliding plates 28 and 29 into the surrounding earth. When it is desired to abandon an anchor and anchor rod, the rod may be given a sharp blow upon its upper end with a sledge hammer, and the frangible members 42 will break or bend downward, permitting the nut to pass them and permitting the guy rod to slide through the anchor.

It will thus be observed that I have invented an earth anchor having means for securely positioning the anchor upon a guy rod during the installation of the anchor, but my invention also permits the release of the guy rod from the anchor when it is desired to drive the guy rod into the earth and to abandon the rod and anchor.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an earth anchor, the combination of a guy rod with an anchor carried by one end of said rod, means on said rod for preventing movement of said anchor off said end, and frangible means carried by said anchor for positioning said anchor on said rod.

2. In an earth anchor, the combination of a tension member, with an anchor, means on said member engaging said anchor and means on said anchor engaging above and below said first mentioned means, said latter means including a frangible part.

3. In a device of the class described, the combination of a guy rod with an anchor having an aperture for said rod, a nut carried by said rod below said anchor and a pair of lugs carried by said anchor below said nut, said lugs being formed with a frangible portion for releasing said rod to bury the same in the earth.

4. In an earth anchor, the combination of a cast metal member of substantially frusto-conical shape and having an axial bore, with a guy rod adapted to be received in said bore, said frusto-conical member having a non-circular socket aligned with said bore and adapted to receive a nut carried by said guy rod, a threaded portion on said guy rod, a nut carried by said threaded portion, and a pair of integral lugs carried by said frusto-conical member and projecting toward said guy rod and below said nut, sai lugs being formed with predetermined frangible portions adapted to be broken by impact upon the end of said guy rod, said lugs being spaced sufficiently from said socket to permit insertion of said nut from the under side of said anchor.

5. In an earth anchor, the combination of a guy member with an anchor member carried by one end of said guy member, means carried by said guy member for preventing movement of said anchor member off said end, and releasable means carried by one of said members, adapted to be actuated by impact on said guy member to release said guy member from said anchor member to bury said guy member in the earth.

6. In an earth anchor, the combination of a guy rod, with an earth anchor adapted to be placed by said guy rod, means on the lower end of said guy rod for engaging the anchor and transmitting a pull from the guy rod to the anchor and frangible means carried by the anchor and engaging below said first mentioned means to prevent the anchor sliding upward on the guy rod in the act of insertion of the anchor by the rod.

7. In an earth anchor, the combination of a guy rod, with an earth anchor adapted to be placed by said guy rod, said guy rod having a threaded portion and said anchor having an aperture passing said threaded portion, with a threaded member for engaging the threaded portion of said rod, and frangible anchor parts located on the opposite sides of said threaded member to transmit a push on said guy rod to said anchor and to prevent said anchor sliding up said rod when the anchor engages an obstruction in the act of placing the anchor in a hole by means of the rod.

8. In an earth anchor, the combination of a guy rod with an earth anchor having a bore for slidably receiving the guy rod, said guy rod having a threaded end, a nut on said threaded end below a part of said anchor, and a frangible part carried by the anchor below the nut to engage the nut and to prevent the anchor sliding up on the guy rod.

9. In an earth anchor, the combination of a guy rod having a threaded portion, with a nut carried by said threaded portion, and an expansible earth anchor comprising a bottom plate having an aperture to receive said guy rod, a pair of sheet metal flukes slidably mounted on said bottom plate, a crosshead slidably mounted on said guy rod, a link from each of said flukes to said crosshead and bendable means for positioning said anchor on said rod, comprising a pair of sheet metal members embracing said nut, to prevent rotation thereof and having stop portions projecting toward each other below said nut.

10. An earth anchor installation comprising a guy rod having a threaded end, an anchor member having a bore passing through the same for receiving said guy rod and slidably engaging said guy rod to permit movement of said guy rod relative to said anchor under predetermined conditions, a nut carried by said threaded end and located on the lower side of said anchor, engaging the lower part of said anchor to transmit a pull from said guy rod to said anchor, and a pair of laterally projecting members carried by the anchor and located directly beneath said nut to prevent said anchor from sliding upward on said guy rod when the anchor is placed in a hole by means of the guy rod, said members being adapted to be broken by engagement with said nut when a blow is struck on the upper end of said guy rod.

11. An earth anchor installation comprising a guy rod having a threaded end, an anchor member having a bore passing through the same for receiving said guy rod and slidably engaging said guy rod to permit movement of said guy rod relative to said anchor under predetermined conditions, a nut carried by said threaded end and located on the lower side of said anchor, engaging the lower part of said anchor to transmit a pull from said guy rod to said anchor, and a pair of laterally projecting members carried by the anchor and located directly beneath said nut to prevent said anchor from sliding upward on said guy rod when the anchor is placed in a hole by means of the guy rod, said members comprising sheet metal members adapted to be bent by engagement with said nut when a blow is struck on the upper end of said guy rod to permit said guy rod to pass through said anchor.

12. The method of disabling an earth anchor and disposing of the guy rod which comprises breaking a frangible part of the anchor by striking a blow on the end of the guy rod, whereby said rod engages said part thereby causing the guy rod to slide through the anchor, and driving the guy rod down into the earth through the anchor until the guy rod is completely embedded.

13. In an earth anchor, the combination of a substantially cylindrical guy rod, said guy rod being provided with threads at its lower end, an earth anchor having a substantially cylindrical bore extending through the same and adapted to be slidably mounted on said guy rod, and the end having a nut internally threaded complementarily to the threads on said guy rod, said nut being located below said anchor and engaging said anchor to resist a pull on said guy rod, and an integral extension of said anchor located adjacent said nut and extending below the same to prevent the sliding upward of said anchor on said guy rod during the installation of said anchor by said guy rod.

14. In an earth anchor, the combination of a substantially cylindrical guy rod, said guy rod being provided with threads at its lower end, an earth anchor having a substantially cylindrical bore extending through the same substantially axially of said earth anchor and adapted to be slidably mounted on said guy rod, and the end having a nut internally threaded complementarily to the threads on said guy rod, said nut being located below said anchor and directly engaging said anchor to resist a pull on said guy rod, and an integral extension of said anchor located adjacent said nut and extending below the same to prevent the sliding upward of said anchor on said guy rod during the installation of said anchor by said guy rod, said extension being sufficiently spaced from said anchor to permit lateral insertion of said nut below said anchor and above said extension whereupon said guy rod is threaded into said nut while held in proper position in said anchor.

15. In an earth anchor, the combination of a substantially conical member provided with a cylindrical bore located substantially axially of the conical anchor, said conical anchor having a non-circular socket located below said anchor and communicating with said bore, and a guy rod passing through said bore threaded into a nut, said nut being located in said non-circular socket directly engaging said anchor and an integral shoulder carried by said anchor and located below said socket extending under said nut to prevent the sliding upward of said anchor on said guy rod during the installation of said anchor by said guy rod.

ALBERT B. CHANCE.